United States Patent
Caillault et al.

(10) Patent No.: US 7,767,281 B2
(45) Date of Patent: Aug. 3, 2010

(54) INKJET RECORDING ELEMENT

(75) Inventors: Oliver A. Caillault, Chalon-sur-Saone (FR); Stephanie V. Desrousseaux, Chalon-sur-Saone (FR); Gerard A. Friour, Chalon-sur-Saone (FR); Jean M. Guilment, Chalon-sur-Saone (FR); Olivier J. Poncelet, Chalon-sur-Saone (FR)

(73) Assignee: Eastman Kodak Company, Rochester, NY (US)

( * ) Notice: Subject to any disclaimer, the term of this patent is extended or adjusted under 35 U.S.C. 154(b) by 828 days.

(21) Appl. No.: 10/597,655

(22) PCT Filed: Jan. 19, 2005

(86) PCT No.: PCT/EP2005/000480
§ 371 (c)(1),
(2), (4) Date: Aug. 2, 2006

(87) PCT Pub. No.: WO2005/075208
PCT Pub. Date: Aug. 18, 2005

(65) Prior Publication Data
US 2008/0220189 A1 Sep. 11, 2008

(30) Foreign Application Priority Data
Feb. 3, 2004 (FR) .................... 04 00979

(51) Int. Cl.
*B41M 5/00* (2006.01)
(52) U.S. Cl. .................... 428/32.24; 423/118.1
(58) Field of Classification Search .......... None
See application file for complete search history.

(56) References Cited

U.S. PATENT DOCUMENTS

| 6,299,302 | B1 | 10/2001 | DeBoer et al. | |
|---|---|---|---|---|
| 6,341,560 | B1 | 1/2002 | Shah et al. | |
| 2005/0157147 | A1* | 7/2005 | Kapusniak et al. | 347/106 |
| 2005/0158483 | A1* | 7/2005 | Kapusniak et al. | 428/32.24 |
| 2005/0158486 | A1* | 7/2005 | Kapusniak et al. | 428/32.34 |

FOREIGN PATENT DOCUMENTS

| EP | 0 976 571 | | 2/2000 |
|---|---|---|---|
| EP | 1 162 076 | | 9/2002 |
| FR | 2 842 541 | | 1/2004 |
| JP | 51 005285 | | 1/1976 |
| JP | 51 005287 | | 1/1976 |
| JP | 11 130422 | | 5/1999 |
| KR | 8 902 143 | | 6/1989 |
| RU | 2205685 | C1 * | 6/2003 |

* cited by examiner

*Primary Examiner*—D. Lawrence Tarazano
*Assistant Examiner*—Gregory Clark
(74) *Attorney, Agent, or Firm*—Andrew J. Anderson

(57) ABSTRACT

The present invention relates to an inkjet recording element showing good dye keeping in time and then good image stability. Said element comprises a support and at least one ink-receiving layer, said ink-receiving layer comprising at least allophane-type amorphous spherical or ring-shaped aluminosilicate particles, said aluminosilicate particles having been submitted to an acidic treatment. Said particles can be natural allophane, purified or not, or allophane obtained by synthesis.

9 Claims, 4 Drawing Sheets

INKJET RECORDING ELEMENT

FIELD OF THE INVENTION

The present invention relates to an inkjet recording element.

BACKGROUND OF THE INVENTION

Digital photography has been growing fast for several years and the general public now has access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3.10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink with high frequency (up to 1 MHz) alternating current (AC) power supply. So that a message can be printed using a single nozzle, every drop must be individually controlled and directed. Electrostatic energy is used for this: an electrode is placed around the ink jet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of them. To prevent other drops from reaching the paper, they are left uncharged: so, instead of going to the support they continue their path without being deflected and go directly into a container. The ink is then filtered and can be reused.

The other category of inkjet printer is drop-on-demand (DOD). This constitutes the basis of inkjet printers used in office automation. With this method, the pressure in the ink cartridge is not maintained constant but is applied when a character has to be formed. In one widespread system there is a row of 12 open nozzles, each of them being activated by a piezoelectric crystal. The ink contained in the head is given a pulse: the piezo element contracts with an electric voltage, which causes a decrease of volume, leading to the expulsion of the drop by the nozzle. When the element resumes its initial shape, it pumps into the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and can print. This enables rapid drying on a wider range of products than conventional systems.

There now exist new "inkjet" printers capable of producing photographic images of excellent quality. However, they cannot supply good proofs if inferior quality printing paper is used. The choice of printing paper is fundamental for the quality of the obtained image. The printing paper must combine the following properties: high-quality printed image, rapid drying after printing, good dye keeping in time, smooth appearance, and high gloss.

In general, the printing paper comprises a support coated with one or more layers according to the properties required. It is possible, for example, to apply on a support a primary attachment layer, an absorbent layer, an ink dye fixing layer and a protective layer or surface layer to provide the glossiness of the inkjet recording element. The absorbent layer absorbs the liquid part of the water-based ink composition after creation of the image. Elimination of the liquid reduces the risk of ink migration at the surface. The ink dye fixing layer prevents any dye loss into the fibers of the paper base to obtain good color saturation while preventing excess ink that would encourage the increase in size of the printing dots and reduce the image quality. The absorbent layer and fixing layer can also constitute a single ink-receiving layer ensuring both functions. The protective layer is designed to ensure protection against fingerprints and the pressure marks of the printer feed rollers. The ink-receiving layer usually comprises a binder, a receiving agent and various additives. The purpose of the receiving agent is to fix the dyes in the printing paper. The best-known inorganic receivers are colloidal silica or boehmite. For example, the European Patent Applications EP-A-976,571 and EP-A-1,162,076 describe inkjet recording elements in which the ink-receiving layer contains as inorganic receivers Ludox™ CL (colloidal silica) marketed by Grace Corporation or Dispal™ (colloidal boehmite) marketed by Sasol. However, printing papers comprising an ink-receiving layer containing such inorganic receivers can have poor image stability over time, which is demonstrated by a loss of color density.

To meet the new requirements of the market in terms of photographic quality, printing speed and color stability, it is necessary to offer a new inkjet recording element having the properties as defined above, more particularly good dye keeping in time.

SUMMARY OF THE INVENTION

The new inkjet recording element according to the present invention, comprises a support and at least one ink-receiving layer, and is characterized in that said ink-receiving layer comprises at least allophane-type amorphous, spherical or ring-shaped aluminosilicate particles, said aluminosilicate particles having been submitted to an acidic treatment. These aluminosilicate particles can for example be natural or synthetic allophane particles.

The present invention also relates to a method for modifying the surface state of allophane-type amorphous, spherical or ring-shaped aluminosilicate particles, said method consisting in submitting said particles to an acidic treatment.

Allophane is found in the natural state in volcanic ashes and glasses. In the present description, "allophane-type aluminosilicate particles" means clay-sized, short-range ordered aluminosilicate particles, amorphous, having the shape of very small spheres or rings, as described notably by Wada in the publication, Journal Soil Sci. 1979, 30(2), 374-355. This morphology is characteristic of allophane and can be used for its identification. According to Wada, the diameter of allophane particles is approximately between 1 and 10 nm and preferably between 3.5 and 5 nm. Allophanes have a composition that corresponds approximately to $Al_2Si_2O_5.nH_2O$. Some degree of variability in the Si:Al ratios is present, but according to Wada, the Si:Al ratio is between 1:2 and 1:1 approximately. Because of the exceedingly small size of the allophane particles and the intimate contact in the soil between allophane and other clays (such as smectites, imogolite, or non-crystalline iron and aluminum oxides and hydroxides and silica), it has proven very difficult to accurately determine the composition of naturally occurring allophane. Generally, with the x-ray diffraction method (XRD) allophane gives weak diffraction peaks at 2.25 and 3.3 Å. Identification is commonly made by infrared analyses or based on transmission electron microscopy.

The inkjet recording element according to the present invention shows good dye keeping in time and then good image stability.

DETAILED DESCRIPTION OF THE INVENTION

Figure 1:
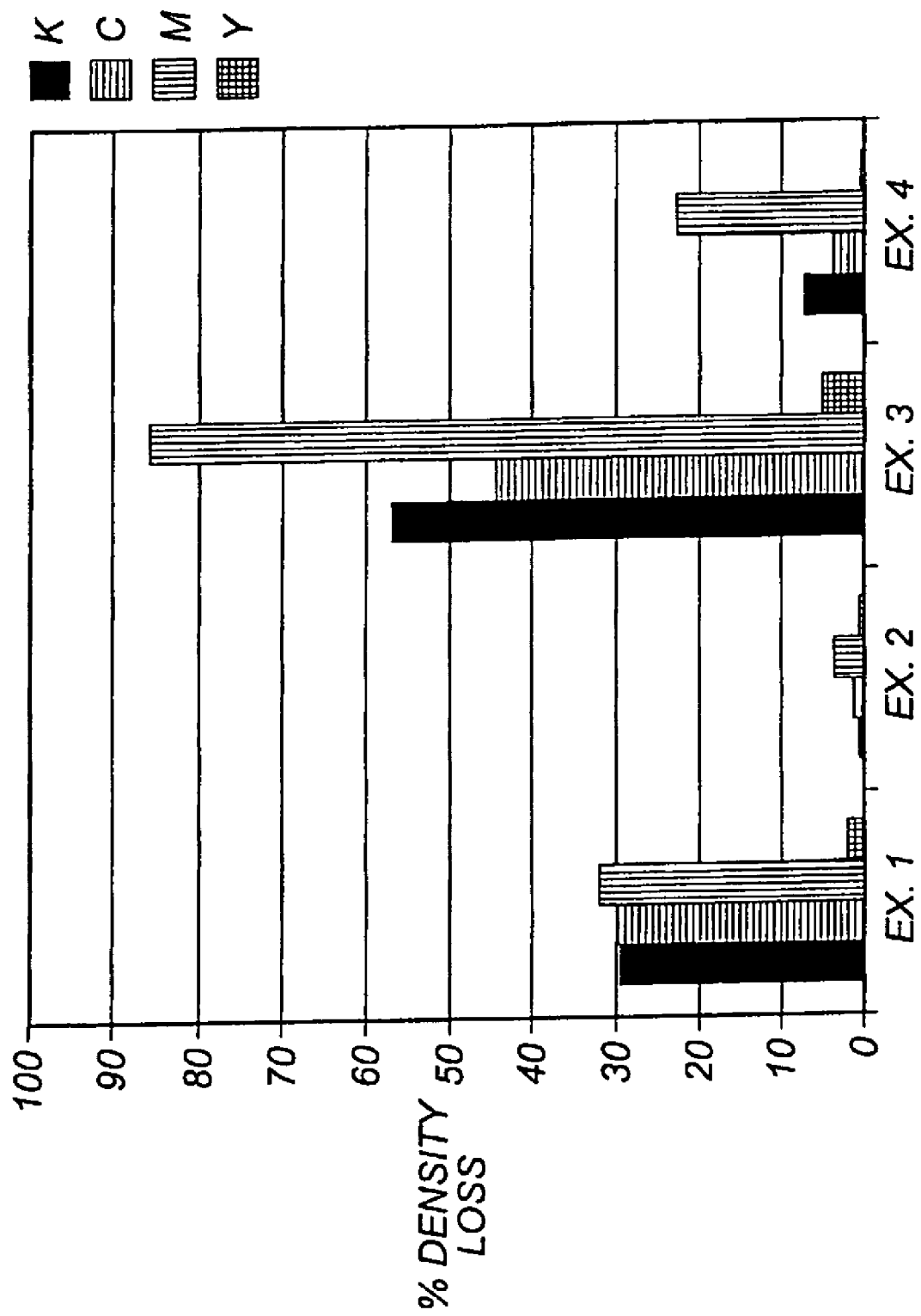
FIGS. 1 to 4 represent the percentage of color density loss for various comparative recording elements and according to the present invention when exposed to ozone.

The inkjet recording element according to the present invention comprises firstly a support. This support is selected according to the desired use. It can be a transparent or opaque thermoplastic film, in particular a polyester base film such as polyethylene terephthalate or polymethylmetacrylate; cellulose derivatives, such as cellulose ester, cellulose triacetate, cellulose diacetate; polyacrylates; polyimides; polyamides; polycarbonates; polystyrenes; polyolefines; polysulfones; polyetherimides; vinyl polymers such as polyvinyl chloride; and their mixtures. The support used in the invention can also be paper, both sides of which may be covered with a polyethylene layer. When the support comprising the paper pulp is coated on both sides with polyethylene, it is called Resin Coated Paper (RC Paper) and is marketed under various brand nanes. This type of support is especially preferred to constitute an inkjet recording element. The side of the support that is used can be coated with a very thin layer of gelatin or another composition to ensure the adhesion of the first layer on the support.

The inkjet recording element according to the invention then comprises at least one ink-receiving layer comprising at least one hydrosoluble binder. Said hydrosoluble binder can be gelatin or polyvinyl alcohol. The gelatin is that conventionally used in the photographic field. Such a gelatin is described in Research Disclosure, September 1994, No. 36544, part IIA. *Research Disclosure* is a publication of Kenneth Mason Publications Ltd., Dudley House, 12 North Street, Emsworth, Hampshire PO10 7DQ, United Kingdom. The gelatin can be obtained from SKW and the polyvinyl alcohol from Nippon Gohsei, or Air Product under the name Airvol® 130.

According to the present invention, the ink-receiving layer comprises, as receiving agent, at least allophane-type amorphous, spherical or ring-shaped aluminosilicate particles, said particles having been submitted to an acidic treatment.

The allophane-type aluminosilicate particles can be allophane particles existing in the natural state. Natural allophane can be purified prior to the acidic treatment. This purification aims to eliminate the iron contained in natural allophane, the iron giving natural allophane a yellow to brown coloring.

Such a purification method is described for example in the publication, O. P. Mehra, M. L. Jackson, Clays Clay Min. 7, 1960, 317-327.

The allophone-type aluminosilicate particles can also be allophane particles synthesized by various methods. Such a method is described in U.S. Pat. No. 6,254,845. This process comprises mixing at a rate of 1-10,000 ml/min a solution comprising 10-1,000 millimoles of a silicon compound and a solution comprising 10-1,000 millimoles of an aluminum compound or a transition metal compound to form a suspension including a salt in solution and precursor particles, removing at least a portion of the salt in solution from the precursor particles, and then subjecting the precursor particles to hydrothermal synthesis to yield hollow silicate particles comprising a silicate and an aluminum or transition metal.

Natural or synthetic allophanes not submitted to an acidic treatment do not have good color stability when they are used as receiving agents in an ink-receiving layer.

According to the invention, the allophane-type aluminosilicate particles have been submitted to an acidic treatment. In the present description, "acidic treatment" means that the allophane-type aluminosilicate particles are put into contact with an acid medium, for example by mixing the allophane-type aluminosilicate particles with an acid medium. The acid medium can comprise a solution of monovalent mineral or organic acid; the selected acid can be hydrochloric acid, perchloric acid or nitric acid. The treatment in an acid medium can be carried out ex situ on the allophane-type aluminosilicate particles or directly in situ during the preparation of the coating compound intended to form the ink-receiving layer. In the first case, the allophane-type aluminosilicate particles are mixed in the acid medium and then the excess acid medium is eliminated, by washing for example. The allophane-type aluminosilicate particles having been submitted to the acidic treatment are then isolated while awaiting use. In the second case, the aluminosilicate particles and the acid medium are directly mixed and added to the other components of the coating composition.

The surface of the allophone-type aluminosilicate particles is modified since the acid solution attacks the Al—OH surface.

The amounts of acid are chosen so that the pH of the coating composition intended to form the ink-receiving layer is less than 7, and preferably between 1.5 and 5.5.

The ink-receiving layer comprises from 5 to 95 percent by weight of allophane-type aluminosilicate particles having been submitted to an acidic treatment compared with the total weight of the dry-state ink-receiving layer.

The coating intended to form the ink-receiving layer is produced by mixing the hydrosoluble binder and allophane-type aluminosilicate particles having been submitted to an acidic treatment. The composition can also comprise a surfactant to improve its coating properties. The composition can be layered on the support according to any appropriate coating method, such as blade, knife or curtain coating. The composition is applied with a thickness between approximately 100 µm and 300 µm in the wet state. The composition forming the ink-receiving layer can be applied to both sides of the support. It is also possible to provide an antistatic or anti-winding layer on the back of the support coated with the ink-receiving layer.

The inkjet recording element according to the invention can comprise, besides the ink-receiving layer described above, other layers having another function, arranged above or below said ink-receiving layer. The ink-receiving layer as well as the other layers can comprise any other additive known to those skilled in the art to improve the properties of the resulting image, such as UV ray absorbers, optical brightening agents, antioxidants, plasticizers, etc.

The inkjet recording element according to the invention has good dye keeping in time. It can be used for any type of inkjet printer as well as for all the inks developed for this technology.

The following examples illustrate the present invention without however limiting its scope.

1) Preparation of Natural Allophane Particles Submitted to an Acidic Treatment

Natural allophane A3561 (CAS No. 12172-71-3) marketed by Sigma was used. The Si:Al molar ratio was about 0.87.

3 g of this natural allophane was put into suspension in 40 ml hydrochloric acid 2M. The mixture was stirred with five 10-mm diameter glass beads for 12 hours with a roller stirrer. The glass beads were then removed and the mixture was centrifuged at 3,000 rpm for 15 minutes. The supernatant was eliminated and solid part was put in suspension in 40 ml water, and then the mixture was stirred for 15 minutes. The mixture was then centrifuged for 15 minutes at 3,000 rpm and then the supernatant was eliminated. The remaining solid was lyophilized for 48 hours. 0.67 g dry powder were obtained.

2) Preparation of Natural Allophane Particles Purified and Submitted to an Acidic Treatment A purification method was used adapted from the method described in the publication, O. P. Mehra, M. L. Jackson, Clays Clay Min. 7, 1960, 317-327.

Natural allophane A3561 (CAS No. 12172-71-3) marketed by Sigma was used. The Si:Al molar ratio was about 0.87. 10 g of this natural allophane was put into suspension in 400 ml sodium citrate solution 0.3M. Then 50 ml of a solution of sodium bicarbonate 1M were added, and the mixture was heated to and maintained at 80° C. Then 10 g of sodium dithionite were added in 15 minutes under stirring. Then 100 ml of a saturated sodium chloride solution were added under stirring. The resulting solid was purified allophane and the resulting supernatant contained iron. The mixture was again stirred for five minutes, then filtered and washed three times with 30 ml of a solution of sodium bicarbonate 1M. 9.2 g of a solid were obtained, with which the above procedure was repeated once.

Elimination of the iron was monitored by measuring the iron concentration in the supernatant by Inductively Coupled Plasma Atomic Emission Spectrophotometry (ICP-AES). Following the first purification, the iron concentration in the supernatant was 198 mg/l. Following the second purification, the iron concentration in the supernatant was 16.6 mg/l.

3 g of the purified allophane obtained by the method described above were used. These 3 g of purified natural allophane were put into suspension in 40 ml hydrochloric acid 2M. The mixture was stirred with five 10-mm diameter glass beads for 12 hours on a roller stirrer. The glass beads were then removed and then the mixture was centrifuged at 3,000 rpm for 15 minutes. The supernatant was eliminated and solid part was put in suspension in 40 ml water, and then the mixture was stirred for 15 minutes. The mixture was then centrifuged for 15 minutes at 3,000 rpm and then the supernatant was eliminated. The remaining solid was freeze dried for 48 hours. 1.29 g dry powder were obtained.

3) Preparation of Allophane by Synthesis

The synthesis method described in U.S. Pat. No. 6,254,845 was used.

184 g sodium orthosilicate was poured into 409 g water until completely dissolved, and then the mixture was brought to ambient temperature.

Separately, 243.8 g $AlCl_3$, $6H_2O$ were added to 543 g water.

Then the aqueous solution of aluminum chloride was poured into the aqueous solution of sodium orthosilicate with strong stirring. The mixture was stirred for one hour at ambient temperature. The Si:Al molar ratio was 0.92. A fine homogeneous white fluid suspension was obtained. The suspension was then vacuum filtered using a jets pump on a 185-mm diameter paper filter for two hours, in order to remove the sodium chloride formed as byproduct. The precursor was found in the cake that adhered to the filter. 686 g cake was obtained, to which 1200 ml water was added. The mixture was stirred for one hour to obtain a homogeneous suspension. Then it was filtered. This washing operation was repeated four times (five washes in all), and then 1200 ml water were added again. The mixture was dispersed by ultrasonic waves for one hour. A fine homogeneous white fluid suspension was obtained. The suspension was stirred at 80° C. for five days. Then it was vacuum filtered by a jets pump on a paper filter. Then lyophilization was performed until constant-weight.

4) Preparation of Compositions Intended to be Layered on a Support to Constitute an Ink-receiving Layer As hydrosoluble binder, polyvinyl alcohol was used (Gohsenol™ GH23 marketed by Nippon Gohsei) diluted to 9% in osmosed water.

Compositions A included as receiving agent natural allophane-type aluminosilicate particles, natural allophone submitted to an acidic treatment prepared according to paragraph 1, purified natural allophane and purified natural allophane submitted to an acidic treatment prepared according to paragraph 2.

All the coating compositions A were obtained by mixing:
  1.29 g aluminosilicate particles (dry matter)
  1.92 g polyvinyl alcohol at 9%
  Water to obtain a final weight of 10.7 g.
The pH of the compositions was about 2.5.
The mixture was homogenized using a roller stirrer and five 10-mm diameter glass beads for 12 hours.
Another coating composition B was obtained directly by mixing the acid and the allophane-type aluminosilicate particles obtained by the synthesis described in paragraph 3 at the time of preparing the coating composition before coating.
Hydrochloric acid at 37% was used for the acidic treatment.

The coating composition B was obtained by mixing:
  13.55 g water
  3 g allophane particles synthesized as per par. 3
  1.65 g HCl at 37%
  4 g polyvinyl alcohol at 9%.
First water, the allophane particles and hydrochloric acid were mixed in this order.
The mixture was homogenized using a roller stirrer and five 10-mm diameter glass beads for 12 hours. Then, before coating, the polyvinyl alcohol was added. The pH of coating composition B was 3.38.
For comparison with composition B, a composition C without acid was prepared, obtained by mixing:
  15.2 g water
  3 g allophane particles synthesized as per par. 3
  4 g polyvinyl alcohol at 9%.

5) Preparation of Inkjet Recording Elements

To do this, a Resin Coated Paper type support was placed on a coating machine, first coated with a very thin gelatin layer, and held on the coating machine by vacuum. This support was coated with a composition as prepared according to paragraph 4 using a blade. The wet thickness was 200 μm for compositions A and 125 μm for compositions B and C. Then, it was left to dry for twelve hours at ambient air temperature (21° C.).

The resulting inkjet recording elements correspond to the examples shown in Table I below giving the receiving agent used in the ink-receiving layer:

TABLE I

| Inkjet recording element | Composition | Receiving agent in the ink-receiving layer |
| --- | --- | --- |
| Ex. 1 (comp.) | A | Natural allophane |
| Ex. 2 (inv.) | A | Natural allophane submitted to an acidic treatment (par. 1) |
| Ex. 3 (comp.) | A | Purified natural allophane |
| Ex. 4 (inv.) | A | Purified natural allophane submitted to an acidic treatment (par. 2) |
| Ex. 5 (comp.) | C | Synthesized allophane (par. 3) without HCl |
| Ex. 6 (inv.) | B | Synthesized allophane (par. 3)/HCl |

6) Evaluation of Dye Keeping in Time

To evaluate dye keeping in time, a dye fading test by exposure to ozone was performed for each resulting inkjet recording element. To do this, targets, comprising four colors (black, yellow, cyan and magenta) were printed on each recording element using a KODAK PPM 200 printed and related ink, an Epson 890 printer and related ink or an Epson Stylus Color 670 printed and related ink. The targets were analyzed using a GretagMacbeth™ Spectrolino spectrophotometer that measured the intensity of the various colors. Then the inkjet recording elements were placed in the dark in a room with controlled ozone atmosphere (60 ppb) for three weeks. Each week, any degradation of the color density was monitored using the spectrophotometer.

FIG. 1 represents the percentage of density loss observed for the original density for the four colors of the target after three weeks for examples 1 to 4 printed using the Kodak PPM 200 printer. Letters K, C, M and Y represent the colors black, cyan, magenta and yellow respectively.

Figure 2:
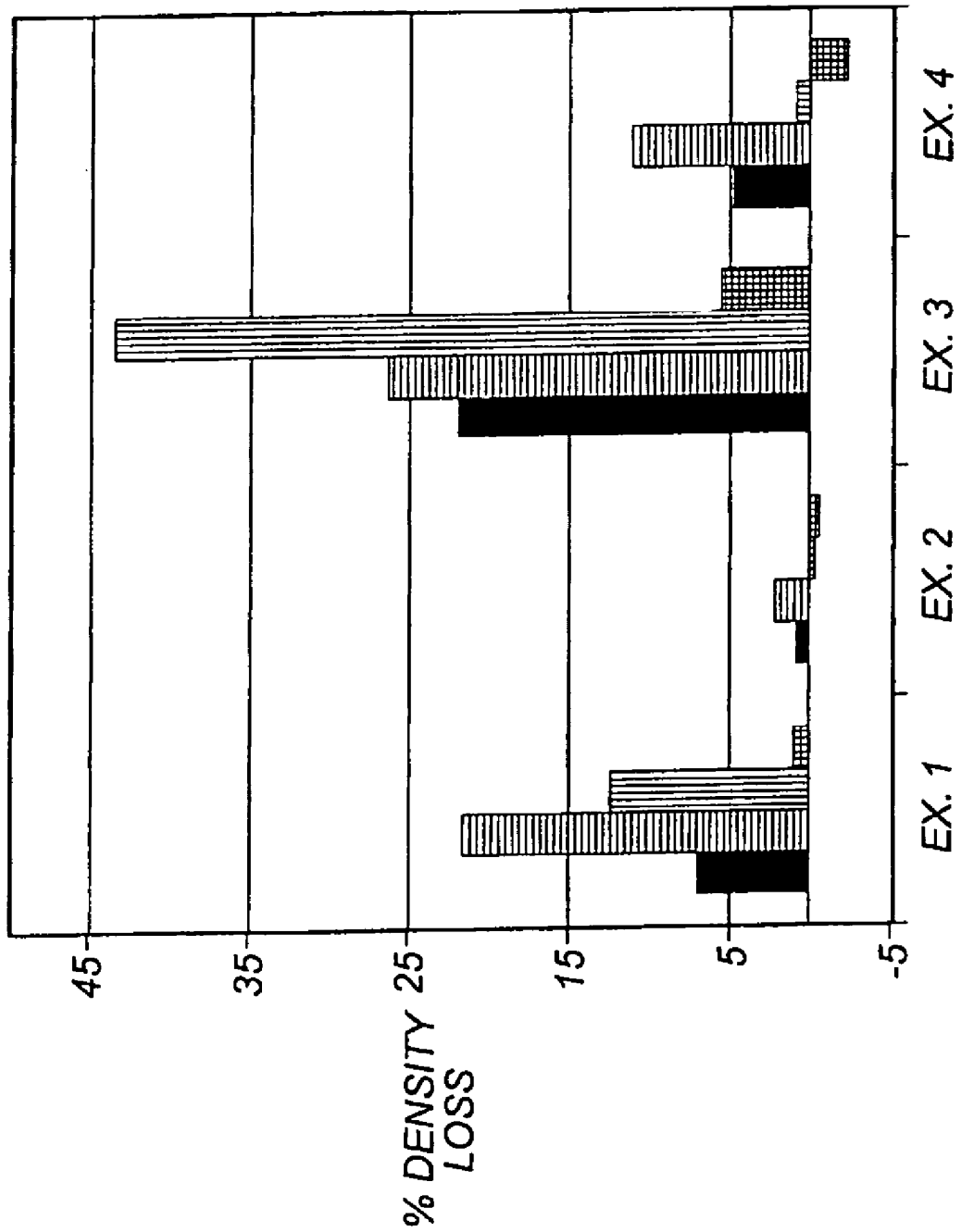

FIG. 2 represents the percentage of density loss observed for the original density for the four colors of the target after three weeks for examples 1 to 4 printed using the Epson 890 printer.

It may be seen that the inkjet recording elements according to the invention (Examples 2 and 4), comprising natural allophane submitted to an acidic treatment, show better dye keeping in time than the elements containing natural allophane not submitted to an acidic treatment (Examples 1 and 3).

Further, the inkjet recording elements comprising the natural allophanes submitted to an acidic treatment, but not first purified, do not have a brown appearance, despite the absence of purification.

Figure 3:
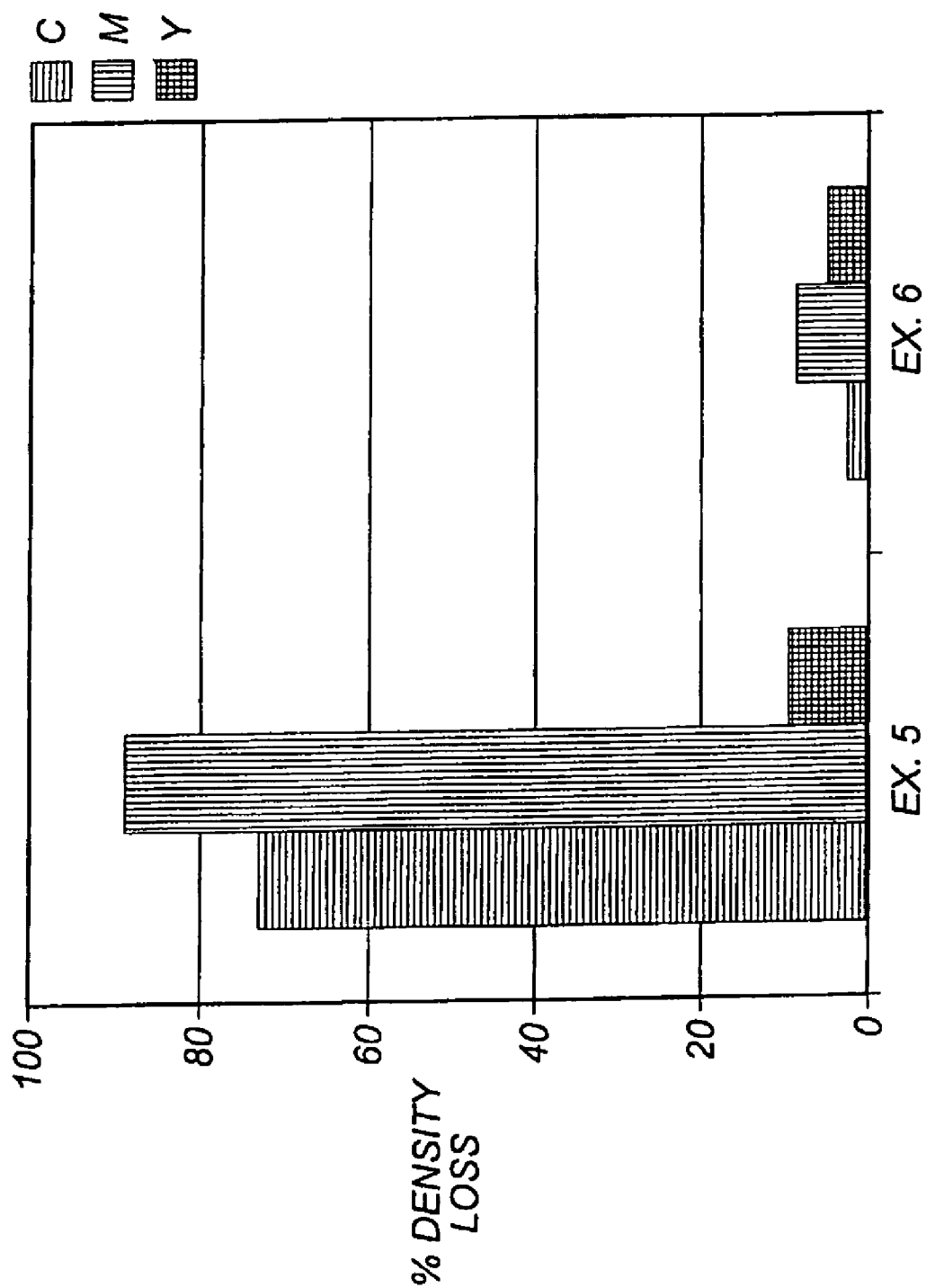

FIG. 3 represents the percentage of density loss observed for the original density at 0.5 for the three colors of the target after three weeks for examples 5 to 6 printed using the Kodak PPM 200 printer. The letters C, M and Y represent the colors cyan, magenta and yellow respectively.

Figure 4:
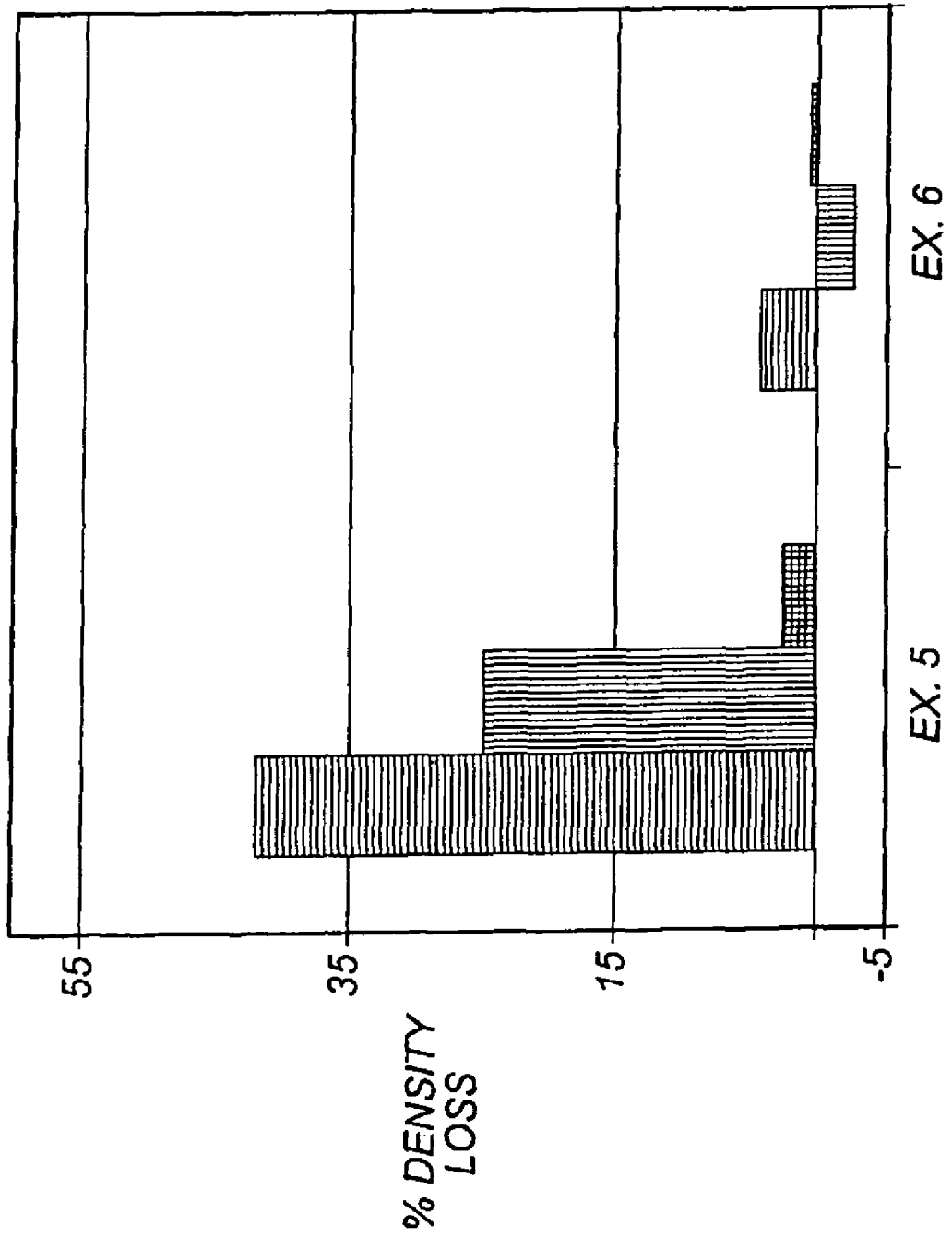

FIG. 4 represents the percentage of density loss observed for the original density at 0.5 for the three colors of the target after three weeks for examples 5 to 6 printed using the Epson Stylus Color 670 printer.

Again, it may be seen that the inkjet recording elements according to the invention (Example 6), comprising synthesized allophane submitted to an acidic treatment, show better dye keeping in time than the element containing synthesized allophane not submitted to an acidic treatment (Example 5).

The invention claimed is:

1. An inkjet recording element, comprising a support and at least one ink-receiving layer, characterized in that said ink-receiving layer comprises at least allophane-type amorphous, spherical or ring-shaped aluminosilicate particles, said aluminosilicate particles having been submitted to an acidic treatment.

2. The recording element according to claim 1, wherein the allophane-type aluminosilicate particles are particles of natural allophane.

3. The recording element according to claim 2, wherein the particles of natural allophane have been purified prior to the acidic treatment.

4. The recording element according to claim 1, wherein the allophane-type aluminosilicate particles are particles of synthetic allophane.

5. The recording element according to claim 1, wherein the acidic treatment consists in putting into contact said allophane-type aluminosilicate particles with an acid medium which comprises an acid selected from the group consisting of hydrochloric acid, perchlorhydric acid and nitric acid.

6. The recording element according to claim 1, wherein the ink-receiving layer comprises between 5 and 95 percent by weight of allophane-type aluminosilicate particles having been submitted to an acidic treatment compared with the total weight of the dry receiving layer.

7. The recording element according to claim 1, wherein the amount of acid is such that the pH of the coating composition intended to form the ink-receiving layer is between 1.5 and 5.5.

8. The recording element according to claim 1, wherein the ink-receiving layer comprises a hydrosoluble binder.

9. The recording element according to claim 8, wherein the hydrophilic binder is gelatin or polyvinyl alcohol.

* * * * *